US010176726B2

(12) United States Patent
Siminou (10) Patent No.: US 10,176,726 B2
(45) Date of Patent: *Jan. 8, 2019

(54) HANDHELD, PORTABLE VISION AID DEVICE AND VISION AID SYSTEM

(71) Applicant: ENHANCED VISION SYSTEMS, INC., Huntington Beach, CA (US)

(72) Inventor: Kamran Siminou, Newport Coast, CA (US)

(73) Assignee: Freedom Scientific, Inc., Clearwater, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/672,204

(22) Filed: Aug. 8, 2017

(65) Prior Publication Data

US 2017/0358247 A1 Dec. 14, 2017

Related U.S. Application Data

(63) Continuation-in-part of application No. 15/053,912, filed on Feb. 25, 2016, now Pat. No. 9,916,771.

(51) Int. Cl.
| G09B 21/00 | (2006.01) |
| H04N 5/232 | (2006.01) |
| G06F 1/16 | (2006.01) |
| H04N 5/225 | (2006.01) |
| H04N 5/262 | (2006.01) |

(52) U.S. Cl.
CPC .......... *G09B 21/008* (2013.01); *G06F 1/163* (2013.01); *H04N 5/2252* (2013.01); *H04N 5/2259* (2013.01); *H04N 5/23212* (2013.01); *H04N 5/23293* (2013.01); *H04N 5/23296* (2013.01); *H04N 5/2628* (2013.01)

(58) Field of Classification Search
None
See application file for complete search history.

(56) References Cited

U.S. PATENT DOCUMENTS 9,916,771 B2 * 3/2018 Siminou .............. G09B 21/008
2012/0218301 A1 * 8/2012 Miller ................. G02B 27/017
345/633

* cited by examiner

*Primary Examiner* — Anand S Rao
*Assistant Examiner* — Tyler B Edwards
(74) *Attorney, Agent, or Firm* — GrayRobinson, P.A.; Michael J. Colitz, III (57) ABSTRACT

A vision aid device comprises a housing having a proximal end, a distal end and a longitudinal axis therebetween. The proximal end has an eyepiece for holding up to an eye and viewing into the vision aid device to view a video display mounted within the housing. A camera is mounted within the housing at the distal end of the housing and is aimed in the direction of the longitudinal axis. A controller is mounted in the housing and is operably coupled to the camera and the video display. The controller is configured to: activate the camera to capture images in a field of view of the camera; and magnify the images to a currently set magnification and display on the display the magnified images on the video display. The device may have a finder function for toggling between the magnified view and an unmagnified view.

21 Claims, 8 Drawing Sheets

HANDHELD, PORTABLE VISION AID DEVICE AND VISION AID SYSTEM

RELATED APPLICATIONS

This is a continuation-in-part of U.S. patent application Ser. No. 15/053,912, filed on Feb. 25, 2016, which is currently pending. Priority to the foregoing prior patent application is expressly claimed, in accordance with 35 U.S.C. Section 119(e), 120, and any other applicable laws. The disclosure of the prior application is hereby incorporated herein by reference in its entirety and for all purposes.

BACKGROUND

The field of the invention generally relates to vision aids for allowing persons with low vision to see by enhancing an image of interest, and more specifically to a portable, vision aid device configured to be held up to a user's eye and which captures and enhances an image, and displays the enhanced image on a display enclosed in the device and viewable by a user's eye through an eyepiece positioned in close proximity to the user's eye.

Various vision aids exist to provide improved viewing of subject matter within a field of view of the vision aid by magnifying (enlarging) the perceived field of view. Many such aids allow those with impaired vision to view printed materials (e.g., books and magazines), digital displays (e.g., LCD, LED, or other monitors), and photographs by creating magnified images of the material or images of the material which may also include enhanced color contrast and/or brightness. This may be useful for people with difficulty in reading, due to blurred vision, macular degeneration, or other vision impairments.

Existing viewing aids typically include a camera, and a viewing surface within a field of view of the camera. If the material remains at a fixed location on the viewing surface, then either the camera is moved relative to the viewing surface (and material), or the viewing surface (and material) is moved relative to the camera. If the material rests freely on the viewing surface, then the material itself may also be moved relative to the camera (and viewing surface). In either case, successive images of the material captured by the camera are either projected on a separate screen such as with CCTV systems, or on a display integrated with the camera.

For those viewing aids involving movement of the camera, the precision required to position the camera to capture images of the target portion(s) of the material may be difficult to achieve in many situations. This may be especially so if the material is printed material intended for reading, and even more so for those who have macular degeneration and need the image to be enlarged, and/or those with motor skill impairments and/or difficulty with hand-eye coordination. The same is true for those viewing aids involving movement of the viewing surface and/or material, as is done with X-Y tables.

A number of portable low vision devices have also been developed for general vision situations (i.e., not viewing reading material or subject matter on a viewing surface). These portable low vision devices typically utilize electronic video cameras which are mounted in a fixture, such as a helmet or goggle that can be worn on the user's head, or a handheld instrument fixture. The devices have a display for displaying a magnified image of the video captured by the video camera. The image of the field of view being displayed by such devices is changed by adjusting the field of view of the video camera to obtain video of a different field of view. This can make it very challenging to keep the video camera steady and/or trained at a particular field of view, and even more so when a user is trying to adjust the device, such as the level of magnification, while viewing and scanning the desired field of view. Hence, these types of devices can be awkward and difficult to use, especially for persons already having low vision.

SUMMARY

The present invention is directed to an innovative, handheld, portable, monocular vision aid device which is configured to be held up to a user's eye and directed at a desired field of view to allow a user to view magnified (and/or otherwise enhanced) video on a video display housed with the vision aid device.

In one embodiment, the portable vision aid device comprises an elongated housing for mounting and protecting the other components. The elongated housing has a proximal end and a distal end and a longitudinal axis extending through the proximal end and the distal end. An eyepiece is disposed on proximal end of the housing and is configured to be held in close proximity to an eye of the user for viewing a display mounted within the housing. The eyepiece has an aperture and a focusing lens disposed the aperture through which the display is viewable by the eye of the user.

A camera is mounted in the housing proximate the distal end of the housing. The camera is aimed in a direction of the longitudinal axis (i.e., direction parallel to the longitudinal axis) such that the camera has a field of view in the direction of the longitudinal axis. The camera is configured to capture electronic images (including video and still images) of subject matter in the field of view. The camera comprises an electronic imaging device, such as a CCD sensor (charge-coupled device) or CMOS sensor (complementary metal-oxide-semiconductor) and optics configured to focus the subject matter in the field of view onto the electronic imaging device.

The vision aid device also has a controller mounted within the housing for controlling the operation of the vision aid device. The controller is operably coupled to the camera and other functional components of the vision aid device, as described herein. The controller comprises a processor and software (including firmware) for operating the vision aid device.

The display, such as an LCD (liquid crystal display), OLED display (organic light emitting diode), AMOLED display (active-matrix OLED), or other suitable display, for displaying video and still images captured by the camera is mounted within the housing and is viewable through the eyepiece. The display is operably coupled to the controller.

The controller is configured to activate the camera to activate the camera to capture images of the subject matter in the field of view and magnify the images to a first magnification and display the images (typically video) at the first magnification on the display. As used herein, the term "magnify" with respect to displaying images on the display means that the images are enlarged (i.e., the view is "zoomed in") as compared to the unaided perceived view of the user. The natural perceived field of view is an image in which the objects would be the same size as would be perceived by the unaided eyes of the user ("unaided eyes" may include refractive correction, e.g. eyeglasses, which correct for refractive error). In one aspect, the vision aid device may be configured to allow the magnification (i.e., the zoom level) of the video displayed on the display to be adjusted, for example, from 1× magnification to 16× magnification, or higher. For instance, the vision aid device may further comprise a zoom control mounted on the housing which is operably coupled to the controller and operable by the user to adjust the zoom level. The controller is further configured to receive a zoom command from the zoom control and to adjust the magnification of the images displayed on the display in response to the zoom command. For instance, the zoom control may be a two-way toggle switch, in which one direction zooms in on the image (increases the magnification), and the other direction zooms out on the image (decreases the magnification).

Accordingly, the provides an improved vision aid device for providing magnified images of a field of view, and which is intuitive and easy to aim and move the field of view to desired subject matter. The user holds the vision aid device up to the user's eye with the eyepiece in close proximity to, including being in contact with, the user's eye. This helps stabilize the vision aid device during use. The user aims the vision aid device to position the field of view on desired subject matter by simply aiming the longitudinal axis of the housing at the desired subject matter. This can typically be done using a single hand to hold the vision aid device up to the user's eye and then adjusting the aim point. The vision aid device displays magnified video on the display at the magnification set by the user which is viewable by the user. As the user moves the aim of the vision aid device, thereby moving the field of view of the camera, the vision aid device displays magnified video of the field of view on the display.

In another aspect of the present invention, the vision aid device may further comprise a finder control which activates a finder function. The finder function allows the user to quickly toggle between viewing images at the first magnification and viewing images at second magnification lower than the first magnification. The second magnification may be unmagnified images, or even reduced from the unmagnified image. The finder control may comprise a finder input device, such as a finder button, mounted on the housing and operable by the user to activate the finder function. The finder control is operably coupled to the controller to send a finder command to the controller when the user activates the finder function. When the user activates the finder control, the controller receives the finder command, and the controller switches from displaying images on the display at the currently set first magnification level to displaying images on the display at the lower second magnification level. The controller may also display a viewfinder (e.g., a reticle) on the display overlaid on the images which indicates the portion of the initial electronic image that would be displayed on the display at the currently set magnification. When the finder control is released (deactivated) by the user, the controller no longer receives the finder command and the controller switches back to displaying the images at the currently set magnification level. In other words, the finder control toggles back and forth between displaying images at the currently set magnification level and at a lower magnification (which may also include display of the viewfinder). The finder control is very useful because the field of view displayed on the display at the lower second magnification is much larger thereby making it easier for the user to locate a target (i.e., desired field of view) and then quickly zoom back in to the currently set magnification level.

The controller may also be configured to modify the currently set magnification using the zoom control while running the finder function. The controller is configured to adjust the size of the viewfinder to indicate the portion of the video being displayed on the display that will be displayed on the display as the magnification level is adjusted by activation of the zoom control. Thus, the viewfinder shows the size of the field of view that will be displayed at the set magnification level. which is the field of view that will be displayed when exiting the finder function. In other words, if the zoom control is activated to zoom in (i.e., increase the magnification), then the size of the viewfinder will decrease accordingly, thereby showing the smaller area of the initial electronic image that will be shown at the higher zoom level, and vice versa. When the finder function is deactivated, the controller displays the video at the selected zoom level. This function allows the user to adjust the magnification while seeing the field of view that will be displayed at the selected magnification.

In another optional feature, the vision aid device may be configured to perform a motion activated, electronic pan of an image captured by the vision aid device. In one embodiment, the vision aid device is further configured to allow a user to view magnified video through the device, freeze an image of a desired field of view, and then adjust the magnification of the image and/or pan the image to view successive magnified images based on motion of the vision aid device as sensed by a motion sensor on the vision aid device. For example, if the user moves the vision aid device to the right, the image is panned to the right to display a magnified image of the portion of the initial image to the right of the previously displayed magnified image. In one aspect, the vision aid device can be configured such that the initial image is panned in a manner which simulates the motion of the vision aid device as sensed by the motion sensor. As used herein, the term "simulate" and its other grammatical forms, with respect to panning the electronic image based on motion of the vision aid device as sensed by the motion sensor, means that the panning is in substantially the same direction as the motion of the vision aid device and the speed of the panning is proportional (or otherwise suitably correlated) to the speed of the motion of the vision aid device. In other words, if the vision aid device is moved to the right, then the electronic image being displayed is panned to the right; and if the vision aid device is moved upward, then the electronic image being displayed is panned upward, and so on for any direction of motion of the vision aid device. Similarly, with respect to speed, if the vision aid device is moved slowly, then the electronic image is panned at a proportionally slow rate, and if the vision aid device is moved faster, then the electronic image is panned at a proportionally faster rate.

In the motion pan embodiment, the vision aid device further comprises memory for storing electronic images captured by the camera operably coupled to the controller and/or the camera and configured to store electronic images captured by the camera. In addition, a motion sensor is operably coupled to the controller and is configured to sense motion of the vision aid device and to provide motion information to the controller based on the sensed motion.

The controller is configured to activate the camera to capture an initial electronic image of the subject matter in the field of view. This may be in response to a user actuating an image capture input device (e.g., an image capture button) or other user input device coupled to the controller, or simply by turning on the device through a power switch. As the user aims the vision aid device at subject matter while viewing the display through the eyepiece, the vision aid device displays video images (e.g., magnified or otherwise enhanced video images) of the field of view to the user on the display. When the user desires to freeze the video in order to view a pannable, magnified image, the user activates the image capture input device. The controller receives a capture command from the image capture input device and the controller captures and stores an initial electronic image of the subject matter in the field of view. The controller stores the initial electronic image in the memory.

The controller then generates a first magnified image of at least a first portion of the initial electronic image and displays the first magnified image on the display in a substantially full-screen mode (i.e., the first magnified image extends over substantially the entire area of the display) and includes only a first portion of the initial electronic image that is less than the full initial electronic image. The controller is further configured to electronically pan the initial electronic image from the first magnified image to display on the display one or more successive magnified images based on motion information generated by the motion sensor, the motion information based on motion of the vision aid device sensed by the motion sensor.

As described herein, the controller may be configured to pan the initial electronic image from the first magnified image in a manner which simulates motion of the vision aid device as sensed by the motion sensor. For instance, the user may hold the vision aid device up to the user's eye (or eyes in the case of a binocular device) and view the first magnified image on the display. As the user moves the vision aid device while still looking through the eyepiece(s) at the display, the motion sensor senses the motion and provides motion information (data) to the controller. The controller processes the motion information and determines the motion of the vision aid device as sensed by the sensor. The controller then pans the initial electronic image from the first magnified image being displayed on the display to display one or more successive magnified images to simulate the direction and speed of motion of the vision aid device as sensed by the sensor. For instance, if the user moves the vision aid device to the right so as to scan to the right of the then-current magnified image being displayed, the controller pans to the right of the initial electronic image to display the portion of the initial electronic image that is to the right of the then-current magnified image being displayed. In addition, if the user moves the vision aid device slowly as sensed by the motion sensor, then the controller pans the initial electronic image proportionally slowly, and if the user moves the vision aid device more quickly as sensed by the motion sensor, then the controller pans the initial electronic image proportionally more quickly.

The controller may also be configured to utilize the finder control in the image capture and motion activated panning mode. When in the image capture and pan mode, if the finder control is activated by the user, the controller receives the finder command, and the controller switches from displaying the magnified image of the initial electronic image to displaying the captured image at a lower magnification level, such as displaying the full initial electronic image. Again, the controller may also display a viewfinder (e.g., a reticle) on the display overlaid on the images which indicates the portion of the initial electronic image that would be displayed on the display at the currently set magnification. The controller is configured to move the viewfinder using the motion sensing function as described above. When the finder control is released by the user, the controller no longer detects the finder command and the controller then displays the portion of the initial electronic image indicated by the viewfinder at the currently set magnification. In the same manner as described above, the controller may also be configured to modify the currently set magnification while running the finder function by using the zoom control which adjusts the size of the viewfinder to indicate the portion of the initial electronic image that would be displayed on the display when exiting the finder function as the magnification level is adjusted by activation of the zoom control. When the finder function is deactivated, the controller displays the portion of the initial electronic image indicated by placement of the viewfinder, and displays such portion at the selected zoom level. This function allows the user to quickly and easily select a desired portion of an image to view from a display of the entire initial electronic image, and/or to adjust the magnification, and then quickly view the selected portion at the adjusted magnification.

In still another aspect, the controller may be configured to enhance and display the images captured by the camera in a plurality of color modes. For example, the controller may be configured to enhance the images and display on the display the enhanced images in one of a plurality of different color modes, including: a full color mode; a black and white mode; a positive image mode; a negative image mode; a green on black mode; a yellow on black mode; and yellow on blue mode. The vision aid device includes a user operable color mode control mounted on the housing and operably coupled to the controller. Activation of the color mode control sends a color mode signal to the controller. In response to the color mode signal, the controller changes the color mode of the vision aid device and displays the images on the display in the selected color mode. The controller is configured to advance through the color modes in a predetermined order each time the color mode control is activated. The controller may also be configured to return to the standard, full color mode upon a special activation of the color mode control, such as activating the color mode control for a minimum time period, such as depressing the color mode control continuously for two seconds.

In yet another aspect, the vision aid device is powered by a battery disposed within the housing. The battery may be disposable or re-chargeable, and replaceable or permanently mounted. The vision aid device may also be handheld such that a user can comfortably hold the entire device up to the user's eye(s) and operate the vision aid device to view video and still images and also to pan magnified images by moving the vision aid device, as described herein.

Another embodiment of the present invention is directed to a vision aid system including the monocular vision aid device and a docking station for viewing subject matter placed in a viewing area of the docking station on a closed-circuit video monitor. The vision aid device further comprises a docking connector operably coupled to the controller and configured to interface between the vision aid device and the docking station. The controller and docking connector are configured to transmit video and images captured by the vision aid device to the docking station. The docking station includes a base, a docking holder supported on the base, a monitor support and a video monitor coupled to the monitor support. The base provides a viewing area below the docking holder. The docking holder is configured to removably hold the vision aid device with the longitudinal axis in a substantially vertical position over the viewing area such that the field of view of the camera of the vision aid device is directed at the viewing area. The docking holder also has a docking station connector configured to connect to the docking connector. When the vision aid device is mounted in the docking holder, the docking connector connects to the docking station connector. The docking station is configured to receive the video and images captured by the vision aid device and display the video and images on the video monitor. The docking station may also include controls for sending controls signals to the vision aid device via the docking station connector. The docking station may have a docking station zoom control, docking station finder control and a docking station viewing mode control.

In another embodiment, a vision aid device according to the present invention is configured to display a binocular view on a pair of displays with each display positioned in front of a respective eye of a user. The binocular version of the vision aid device has most of the same components as the monocular version described above. The vision aid device comprises a headset having a housing configured to be worn on a user's head. For example, the housing may include a pair of temples, similar to the temples of a pair of eyeglasses, such that the vision aid device may be worn similar to eyeglasses.

A camera is mounted within the housing and is configured to capture an electronic image of subject matter in a field of view at which the vision aid device is directed. The camera comprises an electronic imaging device and optics configured to focus the subject matter in the field of view onto the electronic imaging device. A memory is operably coupled to the camera and is configured to store electronic images captured by the camera. A controller is operably coupled to the memory and comprises a processor and software for operating the vision aid device. To provide a binocular view, a pair of displays is mounted within the housing and located such that each display is positioned in front of a respective eye of a user when the headset is worn on a user's head. The displays are operably coupled to the controller, and are configured to display electronic images viewable by the user when the headset is worn on the user's head. A motion sensor is disposed on the housing and is operably coupled to the controller. The motion sensor is configured to sense motion of the headset and to provide motion information to the controller based on the sensed motion. The controller is configured to operate the binocular vision aid device in substantially the same manner as the monocular version, except that the images are displayed on each of the two displays.

In another aspect, the binocular vision aid device may include an external electronic pod which is separate from the headset and which houses most of the electronic components of the vision aid device, such as the controller, memory, battery, etc., but the motion sensor remains disposed on the headset so that it senses the motion of the headset. The electronic pod is operably coupled to the headset via a cable, or via wireless communications. In addition, the binocular vision aid device may include any of the additional features and aspects described above for the single display version of the vision aid device.

BRIEF DESCRIPTION OF THE DRAWINGS

The invention is illustrated by way of example and not limitation in the figures of the accompanying drawings, in which like reference numbers refer to similar elements, and in which.

DETAILED DESCRIPTION

Turning to FIGS. 1-4, one embodiment of a monocular vision aid device 10 according to the present invention is shown. The vision aid device 10 comprises a housing 12, which in the example embodiment of FIGS. 1-5, is an elongated shell 12 having a proximal end 14, a distal end 15 and a longitudinal axis 17 extending through the proximal end 14 and the distal end 15. The housing 12 has a plurality of mounts for attaching components to the housing and a plurality of holes for controls, such as buttons, to extend through the housing 12. The mounts may be pads, mounting holes (e.g., threaded, through-holes, etc.), or other structure for attaching the various components of the vision aid device 10 to the housing 12. The housing 12 may be made of any suitable polymer, such as a molded polymer, or metal (cast, manufactured, forged or other process of forming), or other suitable material.

Figure 1:
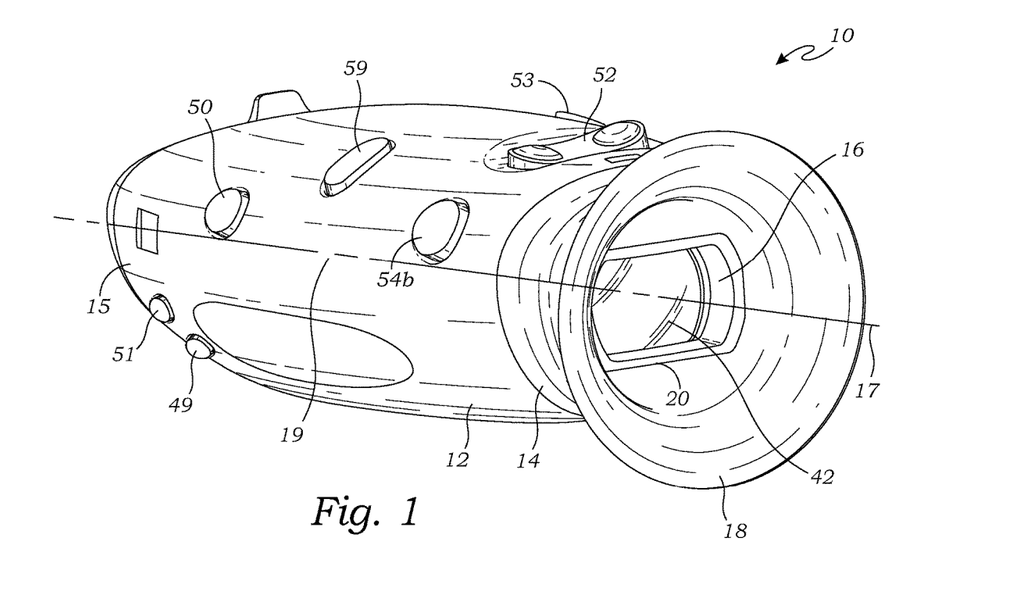
FIG. 1 is a left side, front perspective view of a vision aid device, according to one embodiment of the present invention.
Figure 2:
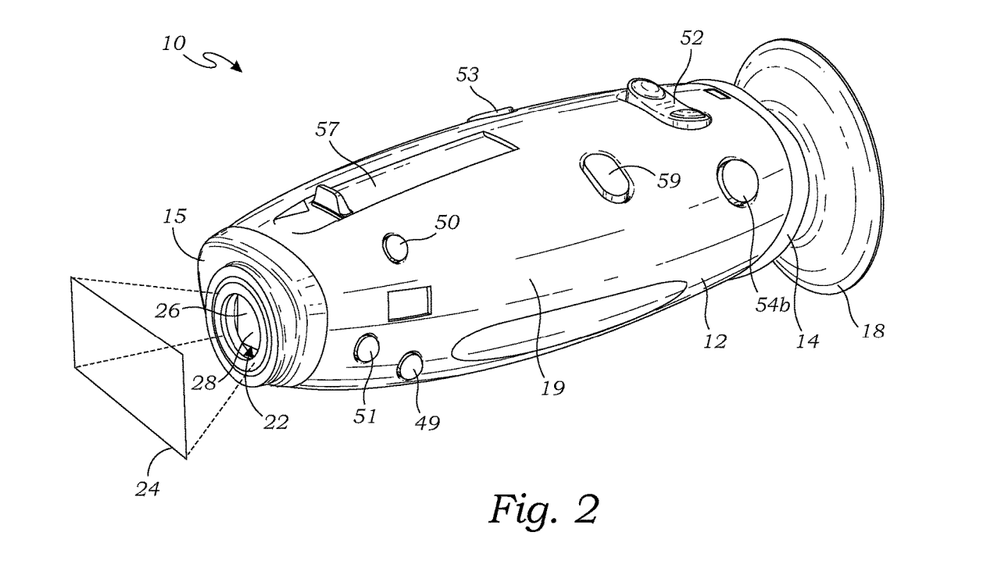
FIG. 2 is a right side, back perspective view of the vision aid device of FIG. 1.
Figure 3:
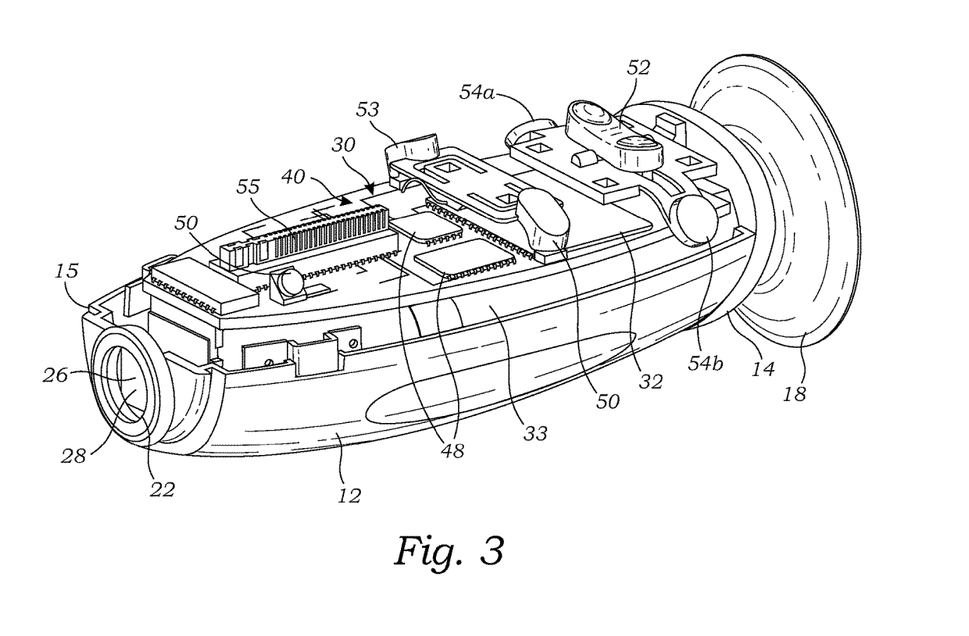
FIG. 3 is a side perspective, transparent view of the vision aid device of FIG. 1.

The proximal end 14 (first end) of the housing 12 has a proximal aperture 16. An eyepiece 18 is disposed on the proximal end 14 of the housing 12 over the aperture 16. The eyepiece 18 has an eyepiece aperture 20 which is aligned with the proximal aperture 16 such that a user can view through the proximal aperture 16 through the eyepiece aperture 20. The eyepiece 18 may be formed of a pliable, resilient material (e.g., rubber, plastic, silicone, etc.) which can be held in place against a user's face, or in close proximity to the user's eye, and the user can then view through proximal aperture 16 and eyepiece aperture 20.

The cross-section of the housing 12 transverse to the longitudinal axis 12 has a substantially oval shape. The cross-section is mostly oval, but may have flat portions, such as the flat portion on the bottom of the housing 12 and on each side. The flat portion on the bottom allows the vision aid device 10 to be stable on a flat surface, and the flat portions on each side may improve the grip on the device 10 by a hand during use. The flat portions may have rubberized inserts disposed on the housing to further improve the grip. For example, the rubberized inserts may be formed of the same pliable material used for the eyepiece 18, The cross-section gradually increases in size from the proximal end 14 to a middle portion 19 at which the cross-section is the largest, and then gradually decreases in size from the middle portion 19 to the distal end 15. The housing 12, and thus the complete vision aid device 10, is sized to be conveniently handheld so that a user can easily hold the vision aid device 10 up to the user's eye (or eyes in the case of a binocular embodiment) to aim and view the vision aid device 10 at a desired scene. Accordingly, the vision aid device 10 is generally less than 6 inches in length, less than 2 inches in diameter (or in width and height, depending on the shape) and less than 0.5 pounds in weight.

A camera 22 is mounted within the housing 12 at the distal end 15 of the housing 12. The housing 12 has a distal aperture aligned with the camera 22 to allow light from the field of view to project onto the camera 22. The camera 22 is configured to capture electronic images, including video and still images, of subject matter in a field of view 24 at which the vision aid device 10 is directed. The field of view of the camera 22 is aimed in the direction of the longitudinal axis 17 of the vision aid device 10. The camera 22 comprises an electronic imaging device 26 such as a charge-coupled device (CCD) or CMOS (complementary metal-oxide-semiconductor), or other electronic imaging device for detecting light focused on the imaging device 26 and converting the detected light into an electronic image. The camera 22 also has optics 28 configured to focus the subject matter in the field of view 24 onto the electronic imaging device 26. The optics 28 may comprise a fixed focal length or an adjustable focal length (e.g., an auto-focusing device, manually adjustable focus, etc.).

Figure 4:
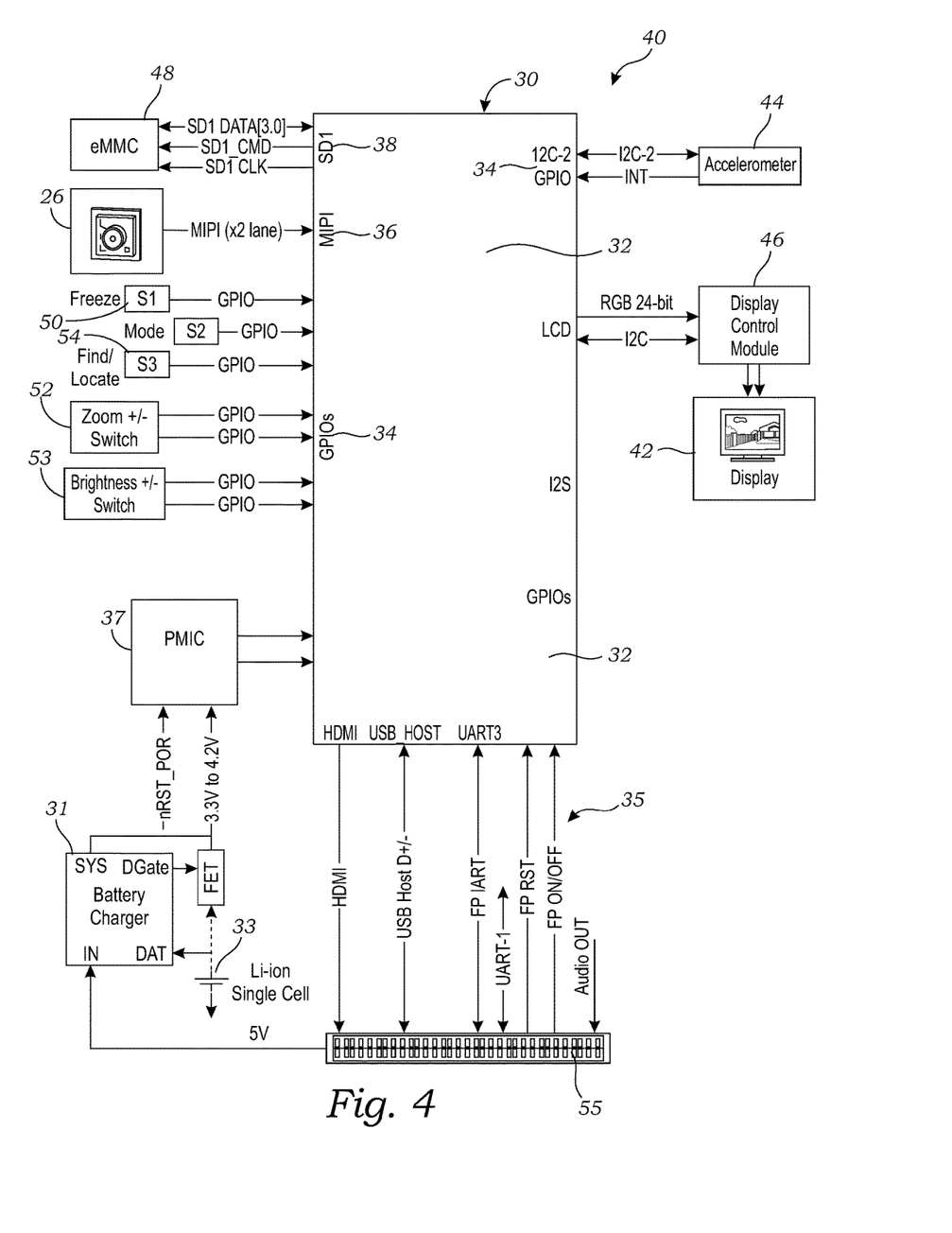
FIG. 4 is block diagram of the electronic system of the vision aid device of FIG. 1.

The vision aid device 10 also has a controller 30 which processes the images captured by the camera 22, displays images on the display 42 (as described below), and controls the overall operation of the vision aid device 10. Turning to FIG. 4, a block diagram of the electronic system 40 of the vision aid device 10, including the controller 30, is shown. The controller 30 may comprise one or more printed circuit boards ("PCBs") and electronic components mounted on the PCBs. The controller 30 includes a microprocessor 32 having general purpose input/output pins/ports 34 ("GPIOs"), a MIPI interface 36 for interfacing with the camera 22, a secure digital memory interface 38, a display control module 46, and other interfaces, ports, functions and features. The microprocessor 32 may be any suitable microprocessor, such as an ARM processor, for instance the iMX6 microprocessor available from Freescale Semiconductors, or other microprocessor.

A memory 48 is operably coupled to the camera 22 via the controller 30. The memory 48 may be any suitable memory, which is preferably a non-volatile memory such as an electronic multi-media card ("eMMC"), including any of flash storage, secure digital memory card, USB memory, etc. The controller 30 is configured to process the images captured by the camera 22 and then store the images in the memory 48. Accordingly, the memory is configured to store electronic images captured by the camera 22 via the controller 30.

A motion sensor 44 is operably coupled to the controller 30 via a GPIO and/or other suitable interface with the microprocessor 32. The motion sensor 44 is configured to sense motion of the vision aid device 10 and to provide motion information to the controller 30 based on the sensed motion. For example, the motion sensor 44 may be a multi-axis accelerometer, such as a microelectromechanical system (MEMS) on a chip design, such as the "multi-axis accelerometer on a chip" products available from Invensense, Inc., STMicroelectronics, Inc., Robert Bosch GmbH, etc.

A display 42 is mounted within the housing 12. The display 42 is configured to display electronic images which are viewable by the user through the eyepiece 18 of the vision aid device 10. The display 42 may be any suitable display, such as an LED display, AMOLED display, etc. The display 42 is operably coupled to the display control module 46 of the controller 30. The display control module 46 is configured to process electronic images stored in the memory 48 and to drive the display 42 to display the electronic images on the display 42.

The vision aid device 10 also has a plurality of user control input devices for operating the vision aid device 10. A power button or power switch 49 is disposed on the housing 12 and is operably coupled to the controller 30 for turning the vision aid device 10 on and off. An image capture button 50 (which may also be referred to as a "freeze" button) is operably coupled to the controller 30. The vision aid device 10 has a default video mode in which the controller 30 activates the camera 22 to take video of the subject matter in the field of view 24 and displays the video on the display 42. This allows the user to view the display 42 by looking through the eyepiece 18 and to move the vision aid device 10 to move the field of view 24 of the camera 22 while viewing the video of the subject matter in the field of view 24 on the display 42. The controller 30 may be programmed to take and/or display the video at a first image resolution which is less than the maximum resolution of the electronic imaging device, and/or less than the maximum resolution of the display 42. The vision aid device 10 has a mode button 51 to select the various modes of operation, such as video mode, still image mode, zoom mode, etc.

When the user wants to freeze the video and view a pannable and/or magnified image, the user pushes the image capture button 50, and the controller 30 receives a capture command from the image capture button 50. In response to receiving the capture command, the controller 30 activates the camera 22 to capture a still, electronic image of the subject matter in the field of view 24. The controller 30 may be programmed to capture and/or display the still, electronic image at a second image resolution which is higher than the first image resolution. For instance, the controller 30 and camera 22 may not be able to capture and/or display video at a very high resolution (e.g., greater than 800 pixels by 800 pixels), but may be capable of capturing and/or displaying a still image at a very high resolution (e.g., greater than 800 pixels by 800 pixels). The controller 30 and image capture button 50 may be configured to toggle the vision aid device 10 back and forth between capturing and displaying video and capturing and displaying a still image.

The vision aid device 10 has a zoom switch 52 operably coupled to the controller 30 for controlling the magnification level (i.e., zoom level) of video and/or images displayed on the display 42. The zoom switch 52 is configured to provide zoom commands to the controller 30, including a "zoom in" command and a "zoom out" command. Thus, the zoom switch 52 may be a two-way toggle switch in which toggling the zoom switch 52 in a first direction provides a zoom in command and toggling the zoom switch 52 in a second direction provides a zoom out command. The controller 30 is configured to receive the zoom commands from the zoom control switch 52 and to adjust the magnification of the video and/or images displayed on the display 42 in response to the zoom commands. For instance, upon receiving a zoom in command, the controller 30 zooms in on the video and/or image displayed on the display (increases the magnification), and upon receiving a zoom out command the controller 30 zooms out on the image (decreases the magnification).

The vision aid device 10 also has a finder button 54 operably coupled to the controller 30 and operable by the user for activating a finder function. The finder button 54 provides a finder command to the controller 30. For the convenience of the user, such as to accommodate left or right-handed use, the vision aid device 10 may include two finder buttons 54*a* and 54*b* which activate the same function in the vision aid device 10. When the finder button is depressed, the controller receives a finder command signal that the finder button 54 is depressed. In response to the finder command signal, the controller 30 reduces the magnification of the video and/or image being displayed on the display 42 to an unmagnified view. In one embodiment, the controller 30 may reduce the magnification such that the entire video or image captured by the imaging device 26 is displayed. In other embodiments, the controller 30 may reduce the magnification to a lower magnification, such as a pre-set magnification or a predetermined factor of the currently set magnification without the finder button 54 depressed. For instance, the controller 30 may be configured to reduce the magnification by a factor of 50%, or 33%, or 66% or 75%, or 90%, in response to the finder button 54 being depressed. For example, if the currently set magnification without finder button 54 being depressed is a 50% magnification, then reducing the magnification by 50% would result in a 25% magnification when the finder button 54 depressed.

By using the finder button 54, the user can view the video at a reduced magnification form the currently set magnification, such as the full field of view 24 of the imaging device 26, in order to more easily and quickly locate a desired viewing target, aim the center of the field of view at the desired viewing target, and then view the desired viewing target at the previously set magnification (by releasing the finder button 54), without having to incrementally zoom out to identify the target and then zoom back in, as would be required if using the zoom switch 52.

When the finder button 54 is depressed, and the controller 30 is receiving the finder command signal, the controller 30 may also be configured to display an electronically generated viewfinder on the display 42 overlaid on the reduced magnification image which indicates the field of view of the image that will be displayed when the finder button 54 is released and the controller 30 displays the video or images being captured by the imaging device 26 at the currently set magnification. The viewfinder displayed on the display may be a reticle or other suitable graphic which indicates the field of view at the currently set magnification level.

The controller 30 may also be configured to modify the currently set magnification level using the zoom switch 52 while running the finder function. While the finder function is activated, the controller 30 adjusts the size of the viewfinder as the magnification level is adjusted by activation of the zoom switch 52 to indicate the portion of the lower magnification video or image that will be displayed on the display when exiting the finder function. In other words, if the zoom switch 52 is activated to zoom in (i.e., increase the magnification), then the size of the viewfinder will decrease accordingly thereby showing the smaller area of the video or image will be shown at the higher zoom level, and vice versa. When the finder function is deactivated, the controller displays the portion of the video or image indicated by placement of the viewfinder, and displays such portion at the selected zoom level. This function allows the user to quickly and easily select a desired portion of an image to view from a display of the entire initial electronic image, and/or to adjust the magnification, and then quickly view the selected portion at the adjusted magnification.

In addition to the software programming described above, the controller 30 includes software programming to operate the vision aid device 10, including activating the camera 22 to capture video and still images, storing the video and images in the memory 48, and displaying on the display 42 video and images captured by the camera 22, The software programming for the controller 30 also configures the controller 30 to modify the video and still images, including magnifying the images and displaying the magnified images on the display 42, and displaying the images in a selected color mode.

The vision aid device 10 may also be configured to enhance and display the images captured by the camera in a plurality of color modes. For example, the controller 30 is configured to enhance the images captured by the camera and display on the display 42 the enhanced images in one of a plurality of different color modes. The color modes may include one or more of the following color modes: a full color mode; a black and white mode; a positive image mode; a negative image mode; a green on black mode; a yellow on black mode; and yellow on blue mode. The vision aid device 10 includes a user operable color mode button 59 mounted on the housing 12 and operably coupled to the controller 30. Activation of the color mode button 59 sends a color mode signal to the controller 30. In response to the color mode signal, the controller 30 changes the color mode of the vision aid device 10, enhances the images captured by the camera or stored in memory into one of the color mode options and displays the images on the display 42 in the selected color mode. The controller 30 is configured to advance through the color modes in a predetermined order each time the color mode button 59 is activated. The controller 30 may also be configured to return to the standard, full color mode upon a special activation of the color mode button 59, such as activating the color mode button 59 continuously for at least a minimum time period, such as two seconds, or four seconds, or between 2 seconds and 10 seconds. The color modes provide various color contrasts to improve viewability and/or readability of the images for different low vision conditions and applications, such as reading text or viewing photos or landscape. This allows a user to select a color mode best suited for the user's particular use and vision condition.

The software programming for the controller 30 also configures the controller 30 to receive and process the motion information generated by the motion sensor 44. For instance, the controller 30 is programmed to electronically pan an electronic image based on the motion of the vision aid device 10. The controller 30 receives the motion information from the motion sensor 44 and electronically pans an electronic image to display on the display 42 one or more successive images based on motion information generated by the motion sensor 44. The controller 30 may be configured to electronically pan an electronic image in a manner which simulates the motion of the vision aid device 10, as sensed by the motion sensor 44, as described herein.

As shown in FIG. 3 and in the block diagram of FIG. 4, the vision aid device 10 is fully powered by a battery 33 disposed within the housing 12. The battery 33 may be disposable or re-chargeable, and replaceable or permanently mounted. In the case of a re-chargeable battery 33, the electronic system 40 also has a battery charger module 31 for charging the battery 33.

The electronic system 40 also has a power management integrated circuit (PMIC) 37 configured to manage the power systems of the electronic system 40, including controlling the power of the battery to the controller 30 and each of the components of the controller 30. The electronic system 40 may also have various input/output ports 35 for power input/output, video/audio input/output and data input/output.

Figure 6:
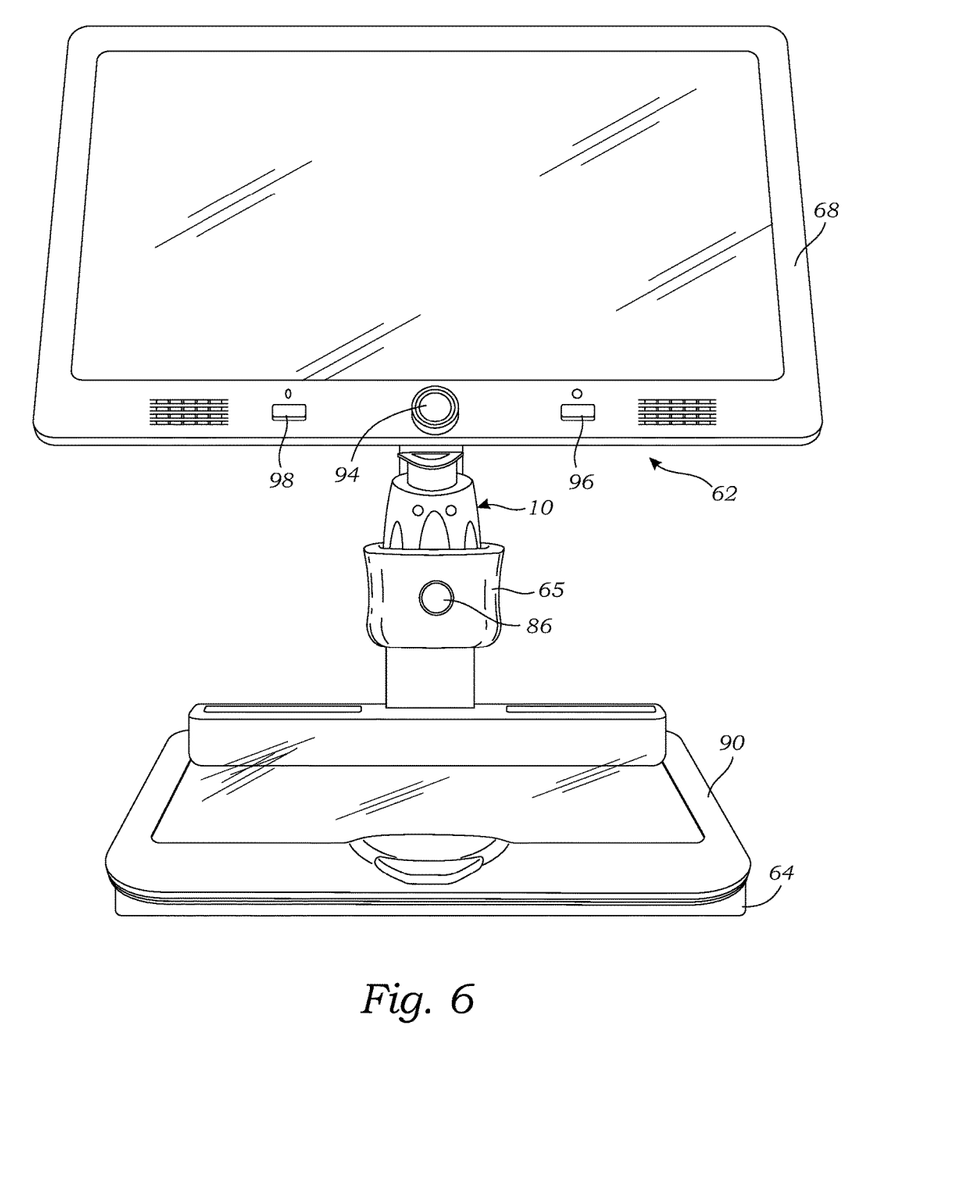
FIG. 6 is a front perspective view of the vision aid system of FIG. 5.

Referring to FIG. 6, another embodiment of the present invention directed to a vision aid system 60 for using the vision aid device 10 to view subject matter, such as printed text, placed in a viewing area of the vision aid system on a video monitor. The vision aid system 60 includes the vision aid device 10, as described herein, in combination with a docking station 62. The vision aid device 10 further comprises a docking connector 55 coupled to the controller and configured to interface between the vision aid device 10 and the docking station 62. The controller 30 and docking connector 55 are configured to transmit video and images captured by the vision aid device 10 to the docking station 62. The vision aid device 10 and docking station 62 may also be configured to allow controls on the docking station 62 to control the operation of the vision aid device 10, including the zoom function, finder function and color mode functions, as described above. This improves the convenience of using the vision aid device 10 in the docking station 62 because the zoom switch 52, finder buttons 54 and color mode button 59 may be difficult to access when the vision aid device 10 is mounted in the docking station 62.

Figure 5:
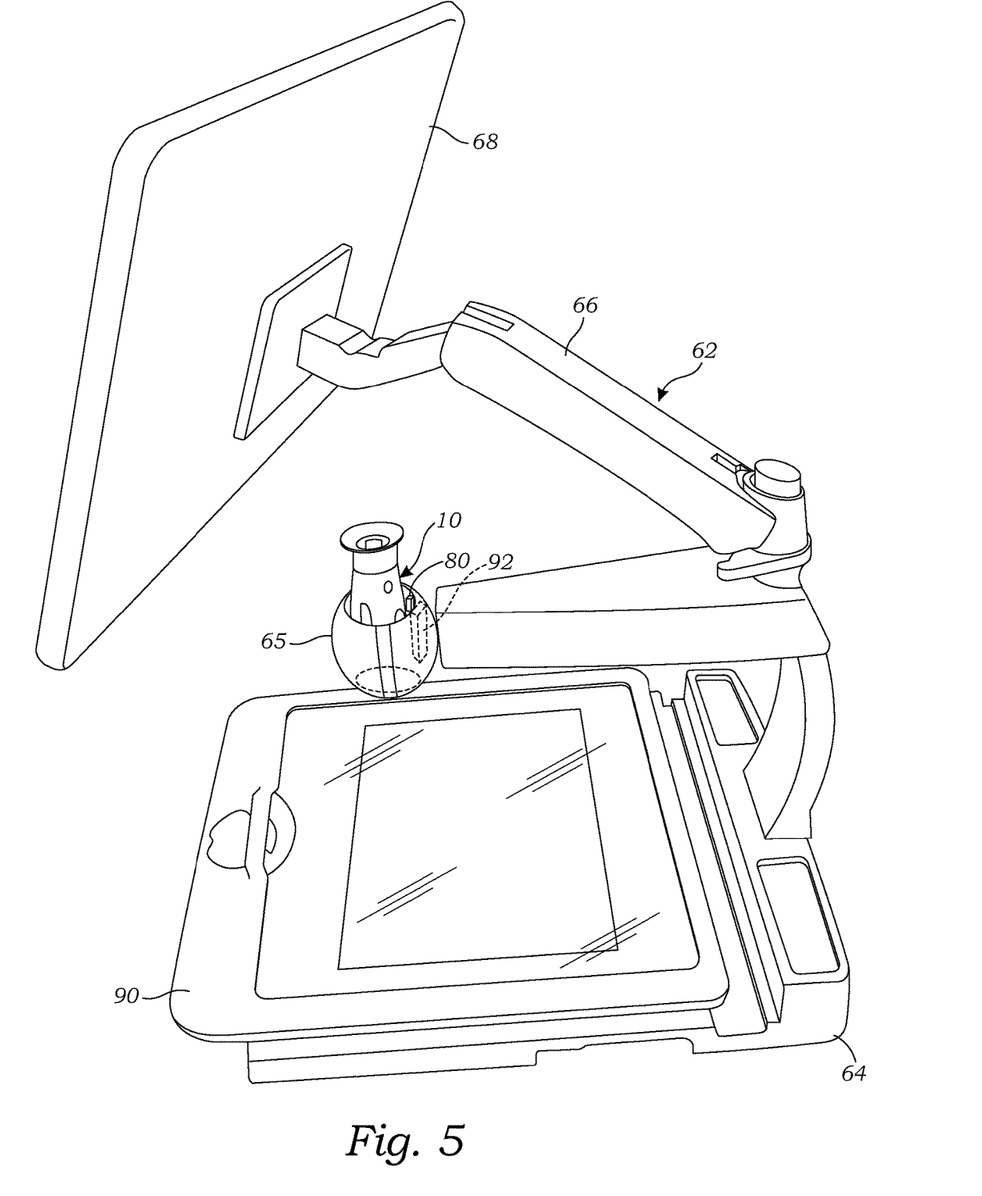
FIG. 5 is a side perspective view of a vision aid system, according to another embodiment of the present invention.

The docking station 62 includes a base 64, a docking holder 65 supported on the base 64, an adjustable monitor support 66 and a video monitor 68 coupled to the monitor support 66. The base 64 provides a viewing area below the docking holder 65. The docking station 62 may have an X-Y table 90 slidably mounted on the base 64. The docking holder 65 is configured to removably hold the vision aid device 10 with the longitudinal axis 17 in a substantially vertical position over the viewing area such that the field of view of the camera 22 of the vision aid device 10 is directed at the viewing area. The docking holder 65 may comprise a two-part cradle having a fixed part 82 and a movable part 84 which is movable relative to the fixed part 82. The movable part 84 is moved away from the fixed part 82 to an open position in order to insert the vision aid device 10 into the docking holder 65, and then the movable part 84 is moved toward the fixed part 82 to a closed position and locked in place to secure the vision aid device 10 in the docking holder 65. The docking holder 65 has a release button 86 which unlocks the movable part 84 so that it can be moved away from the fixed part 82 to the open position in order to remove the vision aid device 10 from the docking holder 65. The docking holder 65 has a docking station connector 92 configured to connect to the docking connector 55 on the vision aid device 10 when the vision aid device 10 is inserted into the docking holder 65 and/or locked in the docking holder 65 by moving the movable part 84 into the closed position. The docking holder 65 has a door catch 80 which opens the access door 57 as the vision aid device 10 is inserted into the docking holder 65.

When the vision aid device 10 is mounted in the docking holder 65, the docking connector 55 connects to the docking station connector 92. The docking station 62 is configured to receive the video and images captured by the vision aid device 10 and display the video and images on the video monitor 68.

A power button 96 turns the power on the docking station 62 on and off. The docking station 62 also includes controls for controlling the display of the video and images captured by the vision aid device 10 on the video monitor 68, including a zoom function, a finder function and a color mode function, as described above. The controls on the docking station 62 may be configured to send signals to the vision aid device 10 in order to perform these functions via the vision aid device 10, or the docking station 62 may have a separate controller to perform these functions. The docking station 62 has a zoom control knob 94, a docking station finder button 76, and a docking station color mode button 98. The zoom control knob 94 adjusts the zoom level (magnification level) of the video and images displayed on the video monitor 68, in the same manner as the finder buttons 54. Rotating the zoom control knob 94 in a first rotational direction zooms in (increases the magnification) and rotating the zoom control knob 94 in the opposite rotational direction zooms out. The zoom control knob 94 may also have a push button function which functions as a finder button to activate a finder function in the same manner as the finder button 54. Alternatively, the docking station 62 may have a separate docking station finder button which activates a finder function in the same manner as the finder button 54. Similarly, the docking station color mode button 98 selects the color mode in the same manner as the color mode button 59.

Turning to FIGS. 7-10, another embodiment of a vision aid device 70 is illustrated in which the vision aid device 70 utilizes a binocular headset 72. The vision aid device 70 has many of the same components as vision aid device 10, wherein like reference numbers refer to like elements, and the description above for such like elements applies equally to the vision aid device 70. The headset 72 of the vision aid device 70 comprises a main housing 12 which is configured to be worn over the eyes on a user's face. The housing 12 has a nose piece 71 which is configured to rest on a user's nose while wearing the headset 72. The headset 72 has two eyepieces 18, two displays 42, and a camera 22 mounted on the housing 12.

Figure 7:
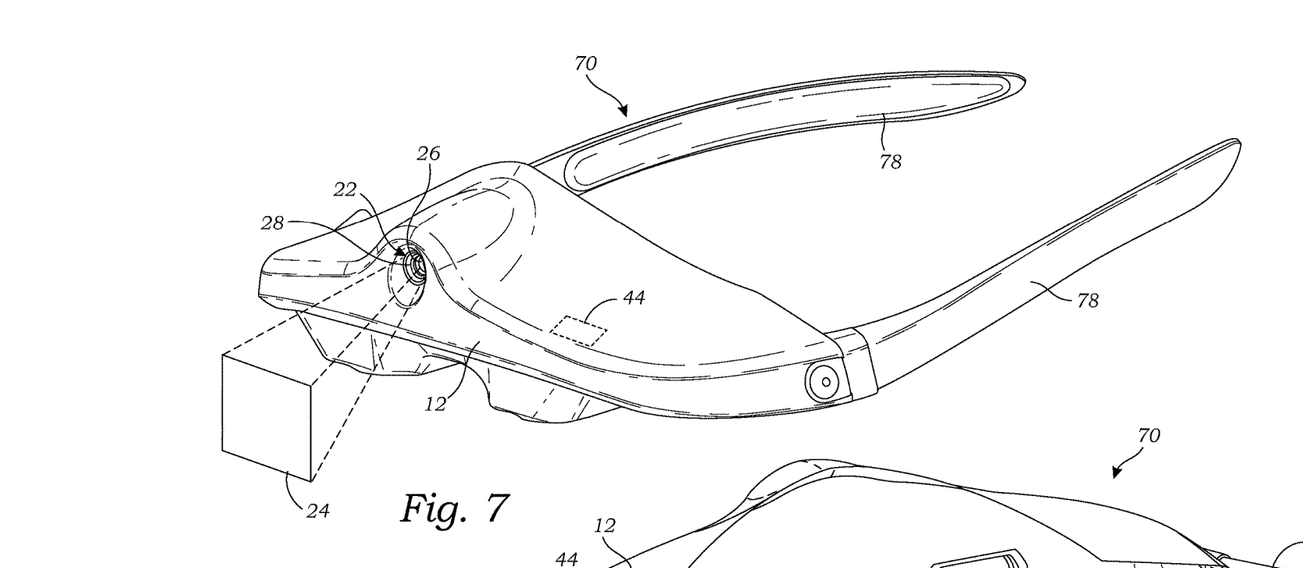
FIG. 7 is a front perspective view of a vision aid device configured to be worn on a user's head, according to another embodiment of the present invention.
Figure 8:
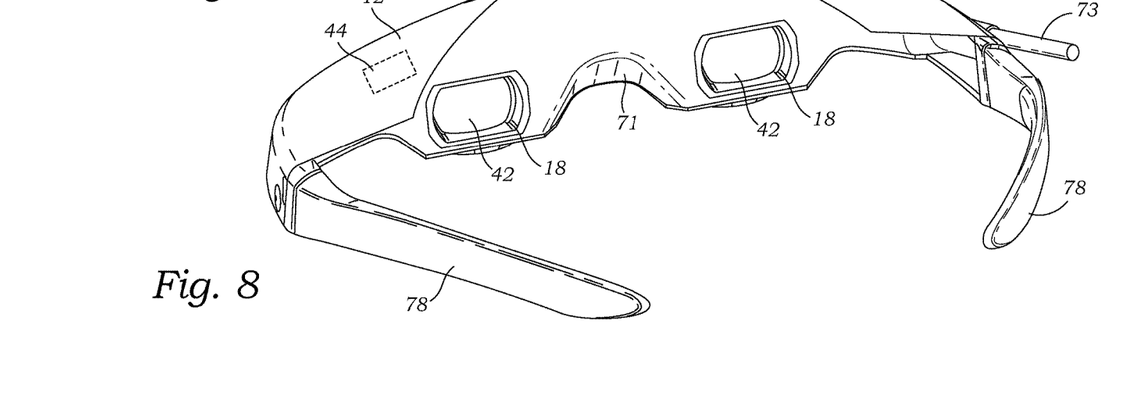
FIG. 8 is a rear perspective view of the vision aid device of FIG. 7.

The headset 72 has two opposing arms/temples 78 same or similar to eyeglasses which extend from the main housing 12. Alternative to the eyeglass style design, headset 72 may be configured as goggles or other head mounted device having a head strap so that the headset 72 can be worn on the user's head over the user's eyes.

The vision aid device 70 also includes an electronic system 40 which is contained in an electronic pod 74 (see FIGS. 8 and 9) which connects via a cable 76 to a connector 73 on the headset 72. The cable 76 transmits electric power and electronic communication signals between the components of the electronic system 40 within the electronic pod 74 and the electronic components of the headset 72 (e.g., the displays 42 and the motion sensor 44). Alternatively, the headset 72 and electronic pod 74 may be configured to communicate wirelessly such as via WiFi or Bluetooth. In such case, the headset 72 includes a wireless communication module and a battery for powering the headset 72.

Figures 9, 10:
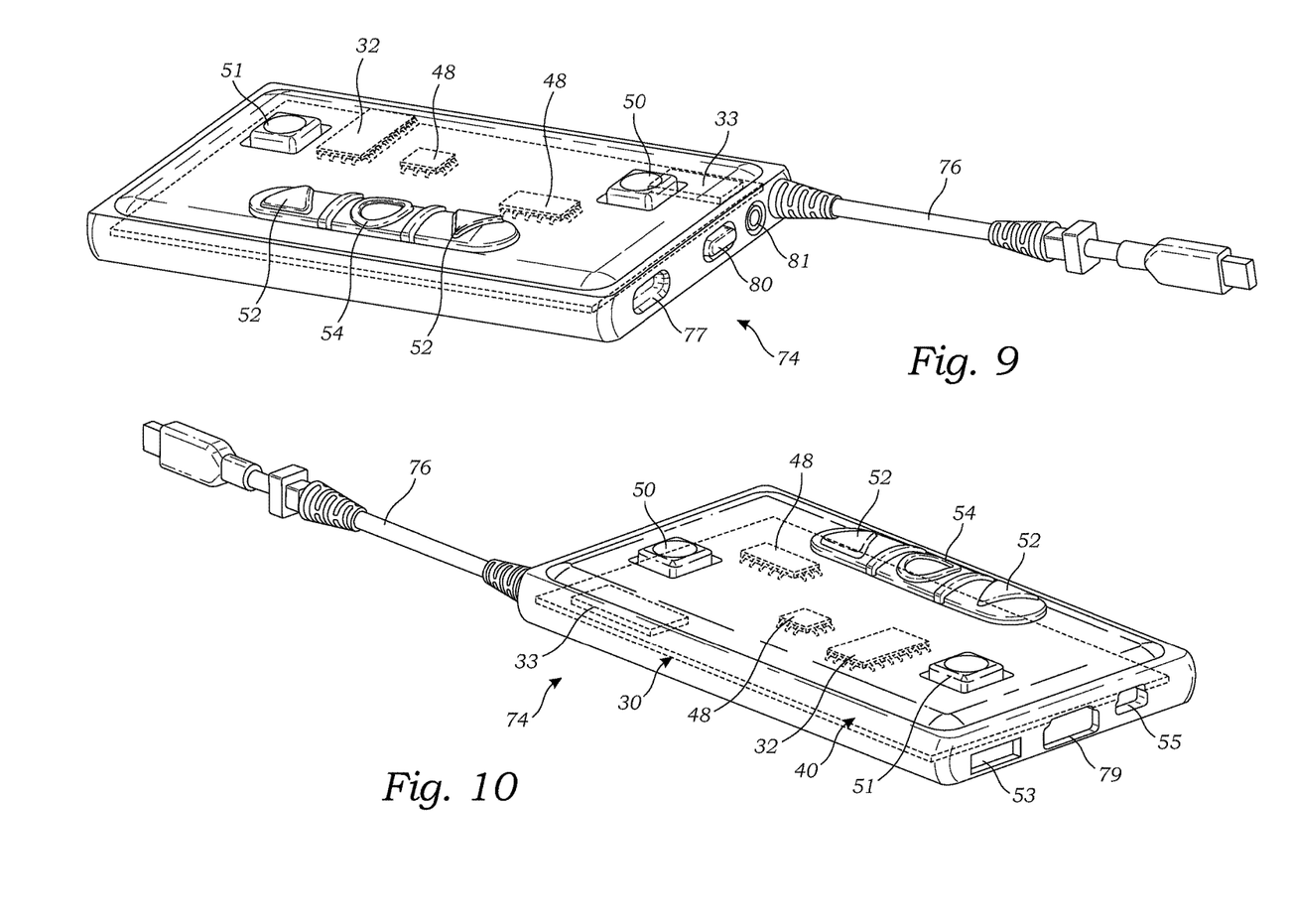
FIG. 9 is a right-side perspective view of an electronic pod for the vision aid devices the present invention, according to another embodiment of the present invention.
FIG. 10 is a left side perspective view of the electronic pod of FIG. 9.

Housing most of the components and the battery 33 of the electronic system 40 in the external electronic pod 74 allows the headset 72 to be much lighter than locating all of components of the vision aid device 70 in the headset 72.

The electronic system 40 is essentially the same as the electronic system 40 for the vision aid device 10, except that it is configured to display images on both displays 42. Thus, the electronic system 40 of the vision aid device 70 may include all of the components and functionality of the electronic system 40 of the vision aid device 10, as described herein.

The motion sensor 44 of the electronic system 40 is disposed in the headset 72 such that the movement of the headset on a user's head is sensed by the motion sensor 44. The motion sensor 44 is operably coupled to the controller 30 via the connector 73, the cable 76 (or other communication mode, such as wireless WiFi, Bluetooth, etc.) and the GPIO and/or other suitable interface with the microprocessor 32. The motion sensor 44 is configured to sense motion of the headset 72 of the vision aid device 70 and to provide motion information to the controller 30 based on the sensed motion.

The electronic system 40 of the vision aid device 70 may also include features and components which are not included in the vision aid device 10 described above. It is understood that the vision aid device 10 may also include these additional features. The electronic pod 74 has a power button or power switch 80 which is operably coupled to the controller 30 for turning the vision aid device 70 on and off. The electronic pod 74 also has a video output connector 77 (e.g., an HDMI connector) operably coupled to the controller 30, and the controller 30 is configured to output an audio/video signal (see FIG. 4). The electronic pod 74 also has a video input connector 79 (e.g., an HDMI connector) operably coupled to the electronic controller 30 and the controller 30 is configured to receive an input audio/video signal and display the video on the displays 42 and play the audio through the audio jack 81 to which headphones or other audio listening device can be connected (see FIG. 4).

The controller 30 of the vision aid device 70 is configured to capture, process, magnify, display and pan images from the camera 22 in the same manner as the controller 30 of the vision aid device 10. The user can then view, capture, zoom and pan the images simultaneously displayed on the respective displays 42 by movement of the vision aid device 70.

In an alternative embodiment, all of the electronic system 40, including the controller 30 and other components of the electronic system 40 may be incorporated into the headset 70, thereby eliminating the need for the electronic pod 74. However, this will typically make the headset 70 heavier, which may make the headset 70 less comfortable than using an external electronic pod 74 as described herein.

In another alternative embodiment, the vision aid device 70 may have two cameras 22 which are offset on the headset 72, such as having camera 22 placed in line with each of the displays 42. The controller 30 of the vision aid device 70 may then be configured to allow the user to view, capture, zoom and pan an image captured by the camera 22 and display the images on the respective displays 42 in a synchronized manner to provide a binocular viewing experience (i.e., a three-dimensional image).

The basic use and functions of the vision aid devices 10 and 70, are straightforward from the descriptions of the functions and features described above. The use and functions of the vision aid device 10 and the vision aid device 70 are substantially the same, so the use will be described with respect to the vision aid device 10, with the understanding that the description applies equally to the vision aid device 70. The vision aid device 10 is powered on when the controller 30 detects that the power button 49 has been depressed by the user. The vision aid device 10 then activates the camera 22, and determines the currently set zoom level (i.e., magnification level) and color mode. The controller 30 then enhances the video captured by the camera according to the set zoom level and color mode and displays the enhanced video on the display 42 at the currently set zoom level and color mode. When the zoom function, finder function, or color mode function are activated by using the respective zoom switch 52, finder button 54 or color mode button 59, the vision aid device 10 performs the respective functions as described herein. Similarly, when the brightness button 53 is activated, the vision aid device 10 adjusts the brightness of the display 42, accordingly and when the imaging mode button 51 is activated, the vision aid device 10 operates in the selected imaging mode.

Figure 11:
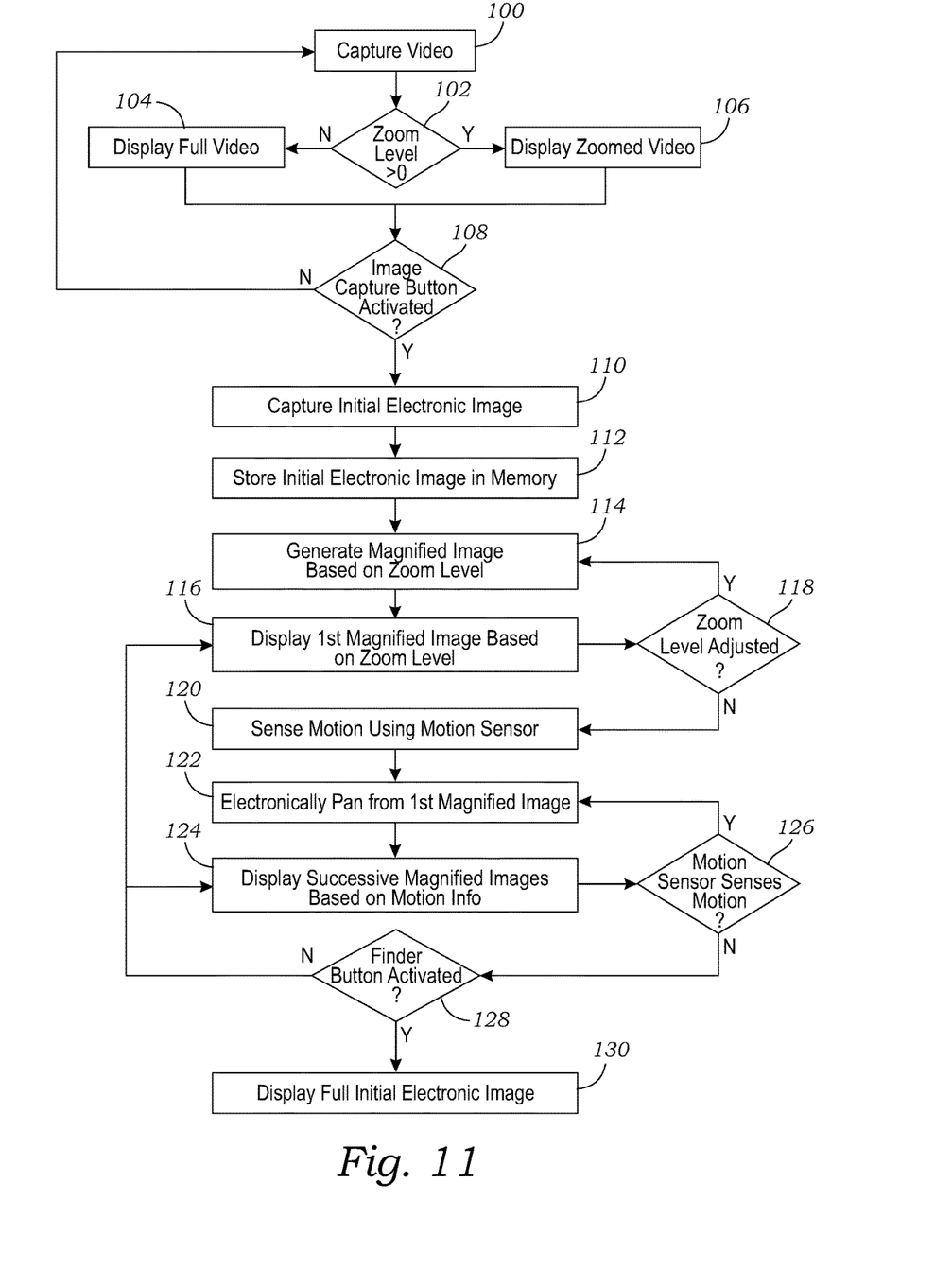
FIG. 11 illustrates a flowchart of the operation and use of the vision aid devices of the present invention, according to another embodiment of the present invention.

The motion activated panning function of the vision aid device 10 will now be described with reference to the flowchart of FIG. 11. At step 100, the vision aid device 10 is powered on and the controller 30 activates the camera 22 to capture video. At step 102, the controller 30 determines the currently set zoom level. If the zoom level is set to no zoom, then at step 104, the controller 30 displays the full extent of the video being captured by camera 22 on the display 42.

If the zoom level has been set to zoom in on the video (i.e., display a magnified view), such as by the user adjusting the zoom using the zoom switch 52, then at step 106, the controller 30 magnifies the video and displays zoomed in (magnified) video of the video captured by the camera 22. In this video mode, the controller 30 will typically display the magnified portion of the video in the middle of the full extent of the video, but the controller 30 can also be configured to display other portions of the video. The zoom level may be further adjusted from a current zoom level for viewing the video, in which case the controller 30 magnifies the video according to the zoom level (which may be no zoom and no magnification), and displays the video magnified according to the selected zoom level. For instance, upon receiving a zoom in command, the controller 30 zooms in on the video displayed on the display (increases the magnification), and upon receiving a zoom out command the controller 30 zooms out on the image (decreases the magnification).

At step 108, the controller 30 determines whether the image capture button 50 has been activated. If the image capture button 50 is not activated, the vision aid device 10 continues to capture and display video as described above. When the image capture button 50 is activated, the controller 30 receives a capture command from the image capture button 50. At step 110, in response to the capture command, the controller 30 activates the camera to capture a still, electronic image of the subject matter in the field of view 24, referred to as an initial electronic image. As described above, the initial electronic image may be captured at a higher resolution than the video resolution.

At step 112, the controller 30 stores the initial electronic image in the memory 48. The camera 22 and/or the controller 30 may perform some image processing on the image captured by the camera 22 prior to storing the initial electronic image in the memory 48.

At step 114, the controller 30 generates a first magnified image of the initial electronic image to be displayed on the display 42. The controller 30 may generate and display the magnified image in any suitable manner. For example, in one way, the controller 30 may generate a full magnified image of the full initial electronic image, and then display on the display only a selected portion of the full magnified image which is less than the full magnified image (and also less than the full initial electronic image). Alternatively, the controller 30 may determine a first portion of the initial electronic image to display which is less than the full initial electronic image. The controller 30 then magnifies the first portion to generate a first magnified image to be displayed on the display 42, and displays the first magnified image on the display. The portion of the initial electronic image to be used for generating the first magnified image to be displayed may default to the middle portion of the full initial electronic image. Alternatively, the controller 30 may display the full initial electronic image on the display 42 and then provide a moveable cursor, pointer, selection box, or other selection device, which the user can move using a directional input device disposed on the vision aid device 10 (e.g., joystick, directional pad, etc.), or by moving the vision aid device 10 as sensed by the motion sensor 44. The user can then select the desired portion to be displayed as the first magnified image by depressing a selection button when the moveable selection device indicates the desired portion of the full initial electronic image. The controller 30 generates the first magnified image based on a current zoom level, which may be a default zoom level or a zoom level selected by the user using the zoom switch 52.

Then, at step 116, the controller 30 displays the first magnified image on the display 42 based on the current zoom level, which may be a default zoom level or a zoom level selected by the user using the zoom switch 52, as described above. At step 118, the controller 30 determines whether the zoom level is adjusted while displaying the first magnified image. If the user adjusts the zoom level, then the controller 30 generates and displays a magnified image based on the adjusted zoom level, i.e., the controller 30 repeats steps 114 and 116, as indicated in the flowchart of FIG. 5. If not, the process continues to step 120.

At step 120, while displaying the first magnified image, the controller 30 monitors the motion sensor 44 and receives motion information from the motion sensor 44. At step 122, the controller 30 receives and processes the motion information and then electronically pans the initial electronic image from the first magnified image and at step 124, the controller 30 displays on the display 42 one or more successive portions of the initial electronic image based on the motion information generated by the motion sensor 44. As described above, the controller 30 may be configured to electronically pan the initial electronic image in a manner which simulates the motion of the vision aid device 10, as sensed by the motion sensor 44. The successive magnified images may also be generated and displayed by the controller in various manners, as described above for the generation and display of the first magnified image. In other words, the controller 30 may magnify the entire initial electronic image to generate a magnified image of the full initial electronic image, and then determine which portions of the full initial electronic image to display based on the motion information generated by the motion sensor, while panning. Alternatively, the controller 30 may determine successive portions of the full initial electronic image to display based on the motion information generated by the motion sensor panning, and then magnify each portion for display, while panning.

At step 126, the controller 30 continuously monitors the motion sensor 44 and receives motion information from the motion sensor 44, and then electronically pans to display successive magnified images, as described above with respect to steps 122 and 124. This is illustrated in the flowchart of FIG. 5 by the loop beginning at step 124 and returning to step 122 via step 126.

If no motion is detected, then at step 128, the controller 30 determines whether the finder button 54 has been activated. If the finder button 54 has been activated, the controller 30 receives a finder command from the finder button. In response to the finder command, at step 130, the controller 30 toggles between displaying the currently displayed magnified image (e.g., the first magnified image or a successive magnified image) and the full, initial electronic image (i.e., the full extent of the initial electronic image). For example, while the controller 30 is displaying a successive magnified image, the user pushes the finder button 54, and the controller 30 then displays the initial electronic image at a lower magnification, such as the full, initial electronic image. The controller 30 may also display a viewfinder on the display 42 overlaid on the image which indicates the portion of the initial electronic image that will be displayed on the display 42 at the currently set magnification. If the viewfinder is not moved, as described below, and the magnification is not modified while in the finder function, when the user releases the finder button 54 to deactivate the finder function, the controller 30 reverts and displays the previously displayed successive magnified image While in the finder function, the position of the viewfinder on the image, and the currently set magnification level may be adjusted. The controller 30 may move the viewfinder using the motion sensing function, or by using another user input device. The currently set magnification is adjusted using the zoom switch 52, in which case the controller 30 adjusts the size of the viewfinder to indicate the portion of the initial electronic image that will be displayed on the display 42 when the finder function is deactivated. When the user releases the finder button 54 to deactivate the finder function, the controller 30 then displays portion of the image indicated by the adjusted position of the viewfinder at the currently set magnification as adjusted during use of the finder function.

Although particular embodiments have been shown and described, it is to be understood that the above description is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims. For example, not all of the components described in the embodiments are necessary, and the invention may include any suitable combinations of the described components, and the general shapes and relative sizes of the components of the invention may be modified. In addition, the steps of the methods and processes of the present invention are not required to be performed in the order as shown in the figures or as described, but can be performed in any order that accomplishes the intended purpose of the methods and processes. Accordingly, embodiments are intended to exemplify alternatives, modifications, and equivalents that may fall within the scope of the claims. The invention, therefore, should not be limited, except to the following claims, and their equivalents.

What is claimed is:

1. A portable, monocular, vision aid device, comprising:
 a housing;
 an eyepiece disposed on the housing and configured to be held in close proximity to an eye of a user, the eyepiece having an aperture and a focusing lens disposed in the aperture through which a video display mounted within the housing is viewable by the eye of the user;
 a camera mounted within the housing and configured to capture an electronic image of subject matter in a field of view at which the vision aid device is directed, the camera comprising an electronic imaging device and optics configured to focus the subject matter in the field of view onto the electronic imaging device;
 a memory operably coupled to the camera and configured to store electronic images captured by the camera;
 a controller operably coupled to the memory, the controller comprising a processor and software for operating the vision aid device;
 a finder control operably coupled to the controller; and
 the display mounted within the housing and operably coupled to the controller and configured to display electronic images viewable by the user through the eyepiece;

the controller configured to: (1) activate the camera to capture images of the subject matter in the field of view; (2) magnify the images to a currently set magnification and display the images at the currently set magnification on the display (3) detect that the finder control has been actuated; (4) in response to detecting that the finder control has been activated, display the images on the display at a second magnification lower than the currently set magnification; and (5) in response to the detecting that the finder control has been deactivated, display the images at the currently set magnification.

2. The portable, monocular, vision aid device of claim 1, wherein the controller detects whether the finder control is activated by receiving a finder control signal from the finder control.

3. The portable, monocular, vision aid device of claim 1, wherein the images captured by the camera are video.

4. The portable, monocular, vision aid device of claim 1 further comprising a zoom control operably coupled to the controller, and wherein the controller is further configured to:
display the images on the display at a second magnification lower than the currently set magnification; and
receive a zoom command from the zoom control and adjust the magnification of the images displayed on the display in response to the zoom command.

5. The portable, monocular, vision aid device of claim 1, wherein the controller is configured to display a viewfinder on the display overlaid on the images being displayed at the second magnification, in response to detecting that the finder control has been activated.

6. The portable, monocular, vision aid device of claim 5, wherein the viewfinder is sized to indicate a field of view of the images being captured by the camera which would be displayed on the display at the currently set magnification.

7. The portable, monocular, vision aid device of claim 6, further comprising a zoom control operably coupled to the controller, and wherein the controller is further configured to:
receive a zoom command from the zoom control to adjust the currently set magnification while displaying the images at the second magnification and the viewfinder overlaid on the images; and
adjust the size of the viewfinder to indicate the field of view of the images being captured by the camera which would be displayed on the display at the adjusted currently set magnification.

8. The portable, monocular, vision aid device of claim 1, further comprising a color mode control operably coupled to the controller, and the controller is configured to:
based on activation of the color mode control, receive a selection of a color mode from a plurality of color modes, including the following color modes: full color mode; black and white mode; positive image mode; and negative image mode; and
enhance the images captured by the camera and display on the display the enhanced images in the selected color mode.

9. The vision aid device of claim 8, wherein the plurality of color modes further comprises: green on black mode; yellow on black mode; and yellow on blue mode.

10. The vision aid device of claim 1, wherein the housing is elongated and has a proximal end, a distal end and a longitudinal axis extending through the proximal end and distal end, and the housing has a substantially oval cross-section transverse to the longitudinal axis, and the cross-section gradually increases in size from the proximal end to a middle portion and gradually decreases in size from the middle portion to the distal end.

11. A portable, monocular, vision aid device, comprising:
an elongated housing having a proximal end and a distal end and a longitudinal axis extending through the proximal end and distal end;
an eyepiece disposed on the proximal end of the housing and configured to be held in close proximity to an eye of a user, the eyepiece having an aperture and a focusing lens disposed in the aperture through which a display mounted within the housing is viewable by the eye of the user;
a camera mounted in the housing proximate the distal end of the housing and aimed in the direction of the longitudinal axis such that the camera has a field of view in the direction of the longitudinal axis, the camera configured to capture an electronic image of subject matter in the field of view, the camera comprising an electronic imaging device and a camera lens configured to focus the subject matter in the field of view onto the electronic imaging device;
a controller operably coupled to the camera, the controller comprising a processor and software for operating the vision aid device;
the display mounted within the housing and operably coupled to the controller and configured to display electronic images viewable by the user through the eyepiece; and
the controller configured to: (1) activate the camera to capture images of the subject matter in the field of view; and (2) magnify the images to a currently set magnification and display the images at the currently set magnification on the display.

12. The portable, monocular, vision aid device of claim 11, wherein the housing has a substantially oval cross-section transverse to the longitudinal axis, and the cross-section gradually increases in size from the proximal end to a middle portion and gradually decreases in size from the middle portion to the distal end.

13. The portable, monocular, vision aid device of claim 12, wherein the camera has a field of view of at least 30 degrees.

14. The vision aid device of claim 12, wherein the eyepiece further comprises a pliable eyepiece element configured to be placed over the user's eye and against the user's face surrounding the user's eye.

15. The portable, monocular, vision aid device of claim 11, wherein the controller is configured to generate and display on the display at magnifications ranging from 1× to 16×.

16. The portable, monocular, vision aid device of claim 11, further comprising a color mode control operably coupled to the controller, and the controller is configured to:
based on activation of the color mode control, receive a selection of a color mode from a plurality of color modes, including the following color modes: full color mode; black and white mode; positive image mode; and negative image mode; and
enhance the images captured by the camera and display on the display the enhanced images in the selected color mode.

17. The vision aid device of claim 16, wherein the plurality of color modes further comprises: green on black mode; yellow on black mode; and yellow on blue mode.

18. A vision aid system for persons with low vision conditions, comprising:

a portable, monocular, vision aid device, comprising:
an elongated housing having a proximal end and a distal end and a longitudinal axis extending through the proximal end and distal end;
an eyepiece disposed on the proximal end of the housing and configured to be held in close proximity to an eye of a user, the eyepiece having an aperture and a focusing lens disposed in the aperture through which a display mounted within the housing is viewable by the eye of the user;
a camera mounted in the housing proximate the distal end of the housing and aimed in the direction of the longitudinal axis such that the camera has a field of view in the direction of the longitudinal axis, the camera configured to capture an electronic image of subject matter in the field of view, the camera comprising an electronic imaging device and a camera lens configured to focus the subject matter in the field of view onto the electronic imaging device;
a controller operably coupled to the camera, the controller comprising a processor and software for operating the vision aid device;
a docking connector coupled to the controller and configured to mate with a docking station docking connector;
the display mounted within the housing and operably coupled to the controller and configured to display electronic images viewable by the user through the eyepiece; and
the controller configured to: (1) activate the camera to capture images of the subject matter in the field of view; (2) magnify the images to a currently set magnification and display the images at the currently set magnification on the display; and (3) transmit the images to a docking station via the docking connector;
a docking station for holding the vision aid device in a position over a viewing area, comprising:
a base configured to support the docking station on a support surface, the base having a viewing area;
a docking holder configured to removably hold the vision aid device with the longitudinal axis of the vision aid device in a substantially vertical position such that the field of the view of the camera is directed at the viewing area; the docking holder, the docking holder having a docking station connector configured to connect to the docking connector;
an adjustable monitor support coupled to the base which allows a position and orientation of a monitor attached to the monitor support to be adjusted;
a video monitor attached to the monitor support; and
wherein the docking station is configured to receive images from the vision aid device and display the images on the video monitor.

19. The vision aid system of claim 18, wherein the docking station further comprises controls for sending control signals to the vision aid device to control: a zoom function for controlling a magnification of the images displayed on the video monitor; a finder function for displaying the images on the video monitor display at a second magnification lower than a currently set magnification while the finder function is activated and displaying the images at the currently set magnification wen the finder function is deactivated; and a color mode function displaying the images on the video monitor in one of a plurality of different color modes.

20. The vision aid system of claim 19, wherein the plurality of color modes includes; a full color mode; a black and white mode; a positive image mode; and a negative image mode.

21. The vision aid system of claim 18, wherein the vision aid device further comprises a finder control operably coupled to the controller, and the controller is further configured to: (1) activate the camera to capture images of the subject matter in the field of view; (2) magnify the images to a currently set magnification and display the images at the currently set magnification on the display (3) detect that the finder control has been actuated; (4) in response to detecting that the finder control has been activated, display the images on the display at a second magnification lower than the currently set magnification; and (5) in response to the detecting that the finder control has been de-activated, display the images at the currently set magnification.

* * * * *